US009931887B2

(12) United States Patent
Eberly, Jr.

(10) Patent No.: US 9,931,887 B2
(45) Date of Patent: Apr. 3, 2018

(54) PAINT CAN HOLDER FOR PAINTING

(71) Applicant: James W. Eberly, Jr., Bozeman, MT (US)

(72) Inventor: James W. Eberly, Jr., Bozeman, MT (US)

(73) Assignee: James W. Eberly, Jr., Bozeman, MT (US)

( * ) Notice: Subject to any disclaimer, the term of this patent is extended or adjusted under 35 U.S.C. 154(b) by 60 days.

(21) Appl. No.: 15/454,687

(22) Filed: Mar. 9, 2017

(65) Prior Publication Data

US 2017/0173995 A1    Jun. 22, 2017

Related U.S. Application Data

(63) Continuation of application No. 14/834,259, filed on Aug. 24, 2015.

(60) Provisional application No. 62/070,448, filed on Aug. 25, 2014.

(51) Int. Cl.

| B65D 25/40 | (2006.01) |
| B65D 35/38 | (2006.01) |
| B44D 3/14 | (2006.01) |
| A45F 5/02 | (2006.01) |
| A45F 5/10 | (2006.01) |
| B65G 7/12 | (2006.01) |
| B65D 25/32 | (2006.01) |

(52) U.S. Cl.
CPC ............... *B44D 3/14* (2013.01); *A45F 5/021* (2013.01); *A45F 5/102* (2013.01); *B65D 25/32* (2013.01); *B65G 7/12* (2013.01); *A45F 2005/1073* (2013.01)

(58) Field of Classification Search
CPC ........ Y10T 292/216; A45F 5/021; A45F 5/02; Y10S 292/49; B44D 3/14
USPC ................................................. 224/269, 677
See application file for complete search history.

(56) References Cited

U.S. PATENT DOCUMENTS 1,689,051 A * 10/1928 Richardson ............... A45F 3/14
                                                              224/259
1,862,701 A    6/1932 Moelter et al.
(Continued)

FOREIGN PATENT DOCUMENTS

| DE | 2351796 | 4/1974 |
| WO | WO9117061 | 11/1991 |
| WO | WO9826943 | 6/1998 |

*Primary Examiner* — Adam Waggenspack
(74) *Attorney, Agent, or Firm* — MacBride Law, PLLC; William L. MacBride, Jr.

(57) ABSTRACT

The invention is a paint can holder, allowing a painter to hold a paint container for easy access when painting, having a base with a ledge integrally formed to the base, securely conforming to a sealing lip of the paint can, and a handle with a pair of inwardly bent legs extending through the handle connecting the handle to the base and a pair of hinge connecting means. An over center clamping member connects to the hinge connecting means, allowing the handle to cause the over center clamping member to clamp the base to the sealing lip of the paint can. A connecting component threads through a clip hole in the base simultaneously attaching to a user's garment. The invention may be used for home improvement or construction to carry a paint and other articles, allowing the paint can to remain upright without spilling.

11 Claims, 7 Drawing Sheets

(56) References Cited

U.S. PATENT DOCUMENTS

| | | | | |
|---|---|---|---|---|
| 2,236,187 | A * | 3/1941 | Penney | B44D 3/14 |
| | | | | 182/129 |
| 2,453,670 | A | 11/1948 | Persson | |
| 2,884,216 | A | 4/1959 | Joecks | |
| 4,993,767 | A | 2/1991 | Song | |
| 5,145,226 | A | 9/1992 | LaFontaine | |
| 5,163,591 | A * | 11/1992 | Leiserson | A45F 5/02 |
| | | | | 224/148.6 |
| 5,377,863 | A | 1/1995 | Widman | |
| 6,022,055 | A * | 2/2000 | Coulonvaux | F16B 2/185 |
| | | | | 24/270 |
| 6,283,345 | B1 * | 9/2001 | Butschat | A45F 5/02 |
| | | | | 224/148.4 |
| D480,555 | S | 10/2003 | Bledsoe | |
| 6,705,480 | B1 * | 3/2004 | Saddler | B44D 3/12 |
| | | | | 220/4.03 |
| 6,863,191 | B2 | 3/2005 | Kesling | |
| 8,931,669 | B2 | 1/2015 | Bajuyo | |
| 8,985,419 | B2 * | 3/2015 | Cowan | A45F 5/102 |
| | | | | 224/148.7 |

\* cited by examiner

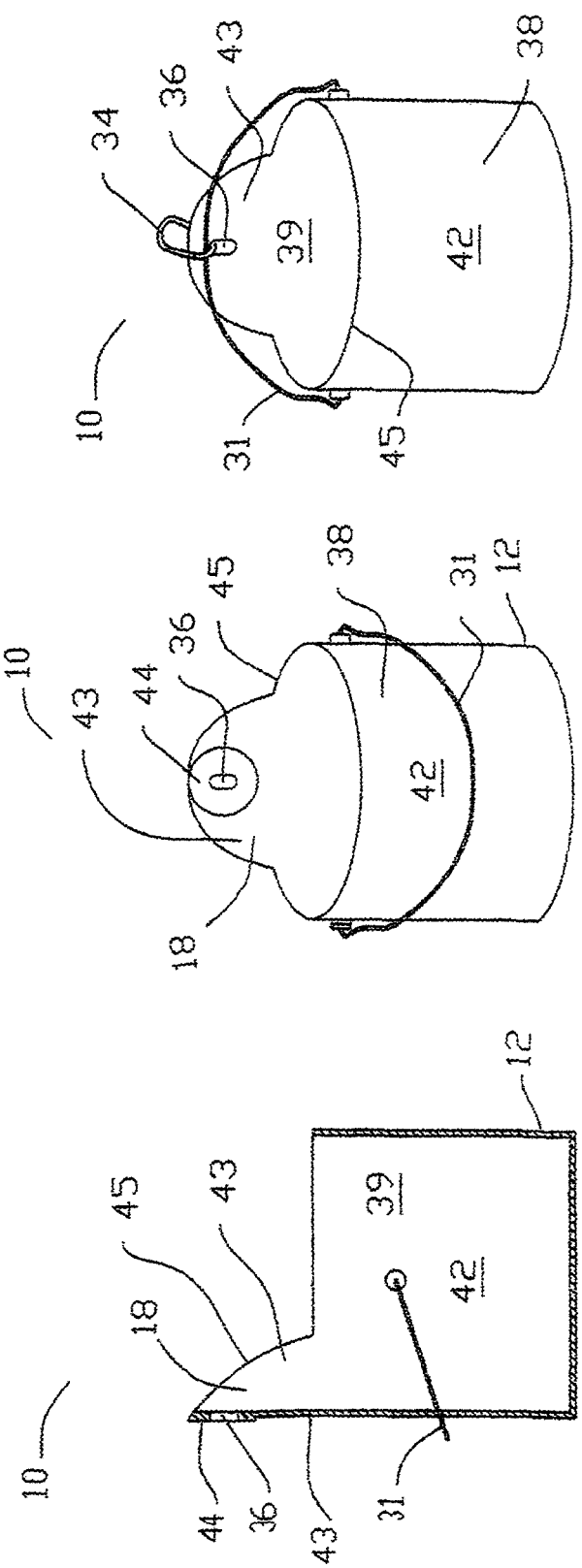

PAINT CAN HOLDER FOR PAINTING

CROSS-REFERENCE TO RELATED APPLICATION

The present application is a continuation application of U.S. application Ser. No. 14/834,259, filed Aug. 24, 2015, with title "Paint Can Holder for Painting" and naming James W. Eberly, Jr. as inventor. The present application claims priority from the provisional patent application filed Aug. 25, 2014, Application No. 62/070,448 and Confirmation Number 8846. All of the foregoing applications are hereby incorporated herein by reference in their entirety.

FIELD OF THE INVENTION

This invention relates to a paint can holder device for painting used to hold a paint can on a belt of a user, allowing for easy access to the paint can when a user is painting a surface. As well, the invention provides a secure, stable paint can during painting.

BACKGROUND OF THE INVENTION

Holding and carrying a paint can while painting presents a painter with certain problems not solved by the prior art currently available. The paint bucket, can or container tips and spills paint. The paint bucket or can bale (handle) turns, interfering with the user dipping his or her brush into the paint container. Many users, painters find it preferable to use a cut bucket for brushing, since the purchased can of paint can is too full to use directly. Holding the paint can by the pivoting can bale can be awkward and difficult, given its thin, metal wire construction.

It is known in the related to have a belt clip allowing a painter to support a paint can from a waist belt from which to access paint. However, the typical arrangement in the prior art does not allows for spillage or awkward use. As well, a convenient and secure latching or locking mechanism is needed to secure a paint can in this belt clipping fashion. Other prior art devices known in the industry require the use of hand held receptacles to hold the paint, without freeing up the user's hands. As well, some devices attach to a user's belt without the benefit of a pivot clip, carabiner or other clip; requiring prior, careful removal of the receptacle to avoid dumping the paint. These devices require, as well, careful use while bending over so the paint receptacle will not spill.

U.S. Pat. No. 8,931,669 to Bajuyo, provides a belt clip to support a paint can from a waist belt, and attaches to the circumferential rim of the paint can. However, Bajuyo and other prior art paint can holder devices do not provide toggle-type latching clips or mechanism. Additionally, Bajuyo discloses a magnet for attaching a paint brush to the device, precluding the convenient use of a toggle latch.

U.S. Pat. No. 6,705,480 to Saddler discloses a paint funneling and pouring clamping attachment for a paint container. The handle or bale, is attached to the paint can by a pair of pivoted over-the-center toggle clip latches that engages the circumferential rim of the paint can to the attachment. The invention disclosed by Saddler does not disclose attaching a single paint can holder toggle clip to the side of the paint can and then to the painter's waist belt. None of the prior art teach or suggest attaching a point can and bale with a toggle clip to a painter's belt or other garment.

SUMMARY

The present invention is directed to a paint can holder for painting, allowing a painter to hold a paint can, container or other receptacle on a belt, and allowing for easy access to the paint can when a user is painting a surface. As well, the invention provides a secure, stable paint can during painting.

The paint can holder for painting, hereinafter the "paint can holder device", comprises a base having a belt end and an opposing can end, a can side having a ledge integrally formed to said base. The ledge has a lip side shaped to securely conform to a sealing lip of a paint can, a base side opposite to the can side, and a pair of opposing handle connecting means integrally formed in said base on the can side proximal to the can end.

The paint can holder device also has a handle with a handle end and pair of opposing inwardly bent legs, each of the opposing pair of opposing inwardly bent legs extending freely through each of the pair of opposing handle connecting means thereby hingedly connecting the handle to the can side of the base. The handle further has a pair of opposing hinge connecting means intermediately disposed, respectively, on the handle between the handle end and the pair of opposing inwardly bent legs.

The paint can holder for painting further has an over center clamping member comprising a hinge end and an opposing hook end, and hingedly, operatively and freely connecting to the pair of opposing hinge connecting means at the hinge end, the pair of opposing hinge connecting means thereby hingedly and operatively connecting the handle to the hook end by the over center clamping member.

The sealing lip of the paint can has a topside surface and an opposing underside surface with the hook end shaped to firmly and releasably engage with the underside surface of the sealing lip. The hook end is shaped to firmly and releasably engage with the underside surface of the sealing lip. The handle operatively causes the over center clamping member at the hook end to clamp the paint can holder base to the sealing lip of the paint can, and further securing the paint can to the user by a connecting component, described below.

The pair of opposing hinge connecting means may be a pair of opposing hinge connecting rings, and the pair of opposing handle connecting means comprise: a pair of opposing handle connecting holes securely seating the pair of inwardly bent legs.

The base further comprises a clip hole located through the base proximal to the belt end of the base, and the connecting component to thread through the clip hole and simultaneously attaching to a user's garment. The paint can has a bale attached to the outside of the paint can and secured within an offset portion of the handle located proximal to the handle end of the handle. The connecting component may be a spring hook, a loop with a spring loaded gate, a pivot clip or a carabiner, attaching to the user's garment.

The ledge may have a notch located in the ledge between the handle and toward the can end and on the lip side in circumferential conformity with the sealing lip, the ledge thereby fitting securely to the sealing lip at the outside of the paint can.

In an alternative embodiment, the paint can comprises a cut paint can container having an outside, an opposing inside and a base, a freely rotating bale attached to the outside of the cut paint container, with the base comprising an elevated bib portion of the cut paint container partially defining the an open edge of the cut paint container, and a clip hole centrally located through the elevated bib portion of the cut paint container. The elevated bib portion is centrally located along the open edge perpendiculary opposed to the bale, and a connecting component threads through the clip hole and concurrently secures the bale and attaching to a user's garment.

The present invention may be used for home improvement or construction painting activities. Another embodiment of the present invention may be used to carry a paint can with the user as described above, to hold and carry other articles in addition to paint. The present invention may be used by painters, handymen, homeowners and other users. One advantage of the paint can or container in the present invention is that the container of paint remains upright, without spilling, when the painter, user bends his or her body. Another advantage of the present invention is that the painter's hands can be completely free to accomplish the painting tasks without holding the paint container.

The aforementioned features, objectives, aspects and advantages of the present invention, and further objectives and advantages of the invention, will become apparent from a consideration of the drawings and ensuing description.

BRIEF DESCRIPTION OF THE DRAWINGS

The foregoing features and other aspects of the present invention are explained and other features and objects of the present invention will become apparent in the following detailed descriptions, taken in conjunction with the accompanying drawings. However, the drawings are provided for purposes of illustration only, and are not intended as a definition of the limits of the invention.

In order that the invention may be clearly understood and readily carried into effect, a preferred embodiment of the invention will now be described, by way of example only, with reference to the accompanying drawings wherein:

FIG. 6A illustrates an elevational base side view of the base of the paint can holder device.

FIG. 6B illustrates a perspective view of the base of the paint can holder device.

FIG. 6C illustrates an elevational side view of the base of the paint can holder device.

FIG. 6D illustrates an elevational can side view of the base of the paint can holder device.

FIGS. 7A-C illustrate various views of another embodiment of the present invention, as follows:

FIG. 7A illustrates a cut away side, elevational view of the cut paint container to this embodiment of the paint can device.

FIG. 7B illustrates a perspective view of the cut paint container to this embodiment of the paint can device.

FIG. 7C illustrates a perspective view of the cut paint container to this embodiment of the paint can device, depicting the bale secured by the connecting means.

DETAILED DESCRIPTION

The present invention will now be described more fully hereinafter with references to the accompanying drawings, in which the preferred embodiment of the invention is shown. This invention may, however, be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout.

Figure 1:
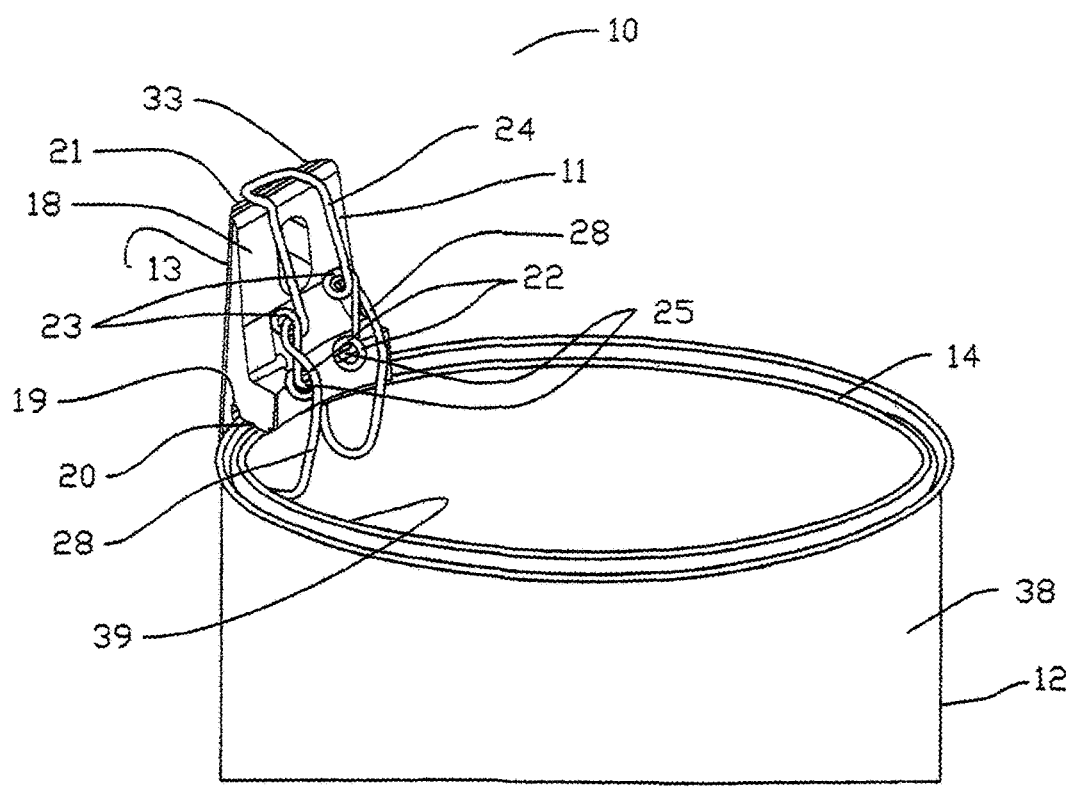
FIG. 1 illustrates a perspective view of a paint can holder device according to the present invention connected to a paint can, the paint can in partial view.
Figure 2:
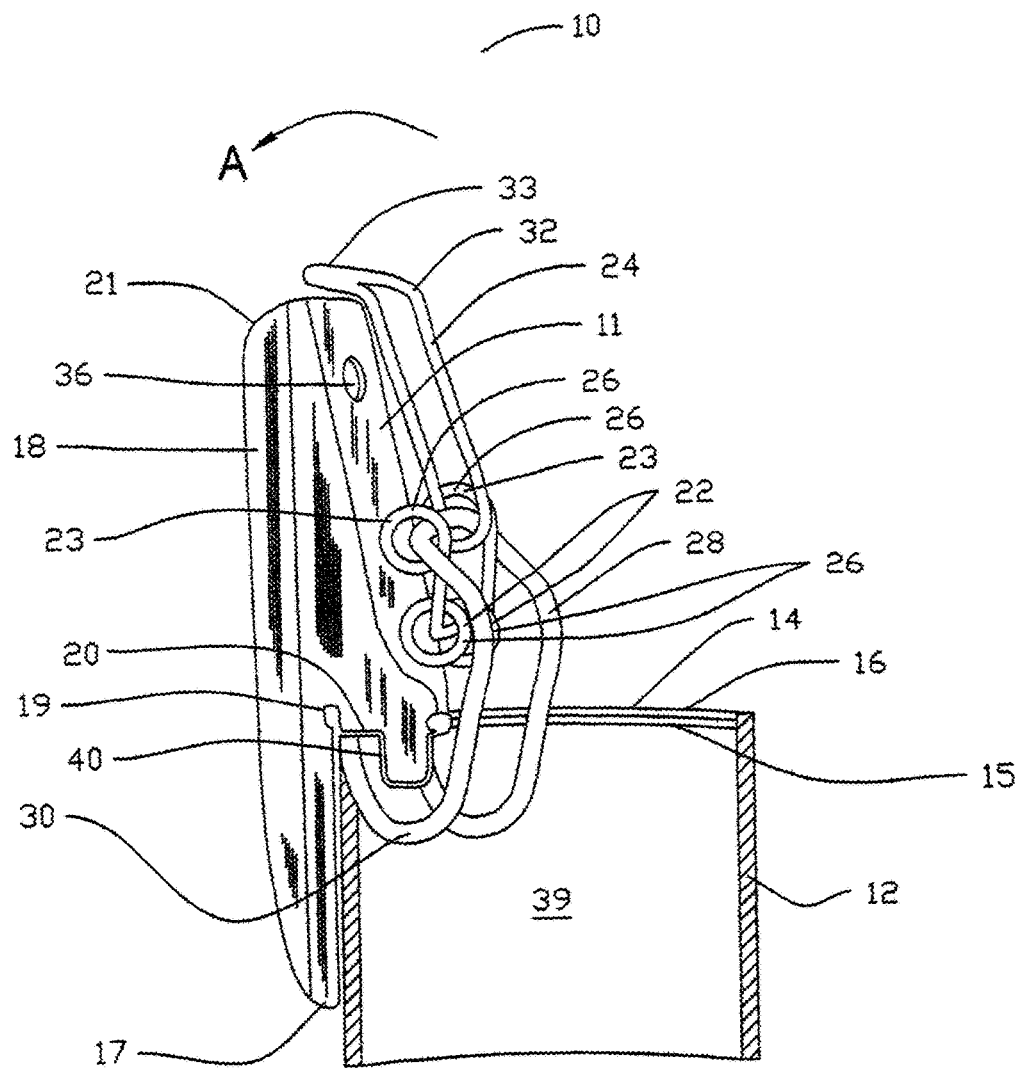
FIG. 2 illustrates an elevational view of the paint can holder device shown in FIG. 1 with a portion of the paint can cut away.
Figure 3:
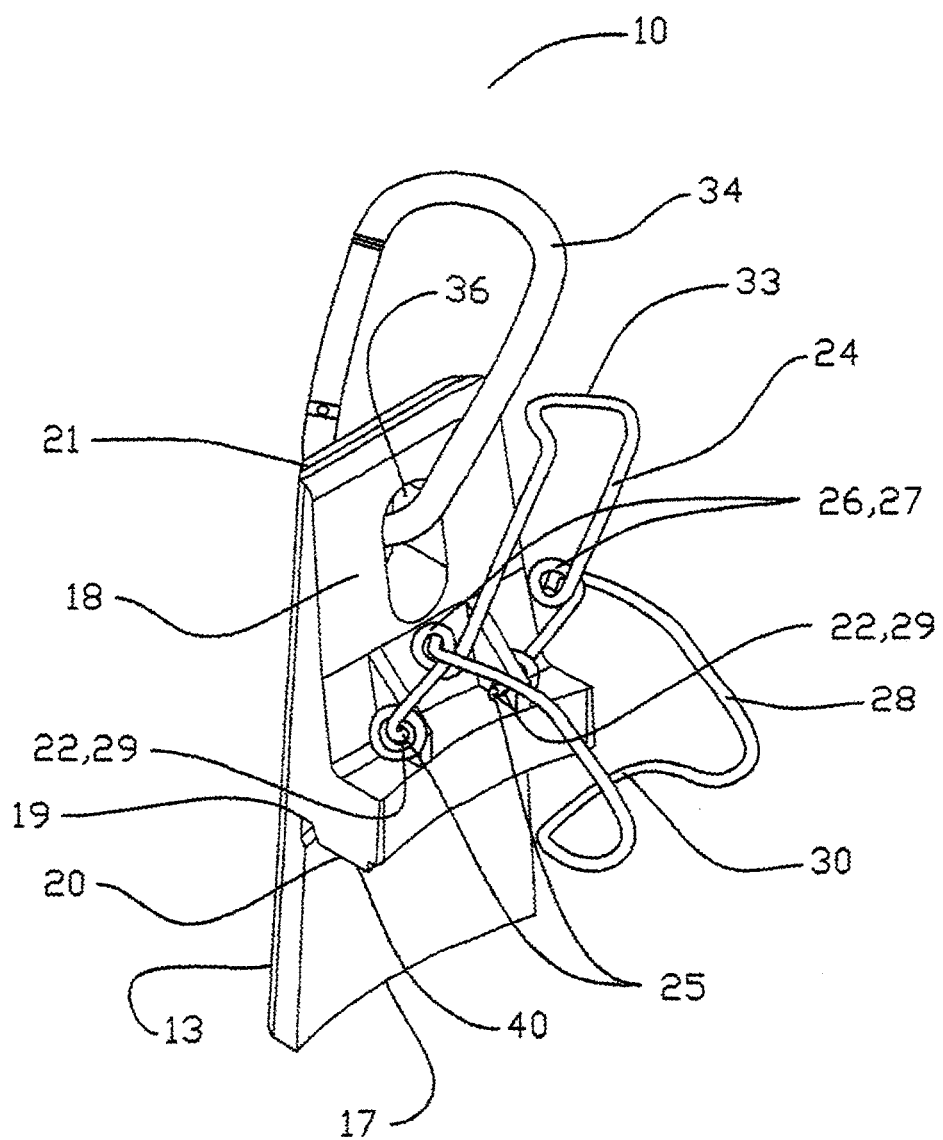
FIG. 3 illustrates a perspective view of the paint can holder device according to the present invention without connection to the paint can.

A paint can holder device 10 is shown in FIGS. 1-3. The paint can holder 10 is used in conjunction with a paint can 12 having a sealing lip 14.

Turning to FIGS. 1 and 2, the paint can holder device 10 includes a base 18 having a belt end 21 and an opposing can end 17, a can side 11 having a centrally located ledge 20 integrally formed to said base 18, the ledge 20 having a lip side 40 shaped to securely conform to a sealing lip 14 of a paint can 12 when resting thereon, as shown in FIGS. 1 and 2. The paint can 12 has an open end 12a and an opposing closed end 12b, shown in FIG. 4, an outside 38 and an opposing inside 39. The base 18 further includes a base side 13 opposite to the can side 11, a pair of opposing handle connecting means 22 integrally formed in the base 18 on the can side 11 proximal to the can end 17. In the embodiment as shown in FIGS. 2 and 3, the pair of opposing handle connecting means 22 comprise a pair of opposing handle connecting holes 29. In an alternative embodiment of the present invention, the pair of opposing handle connecting means 22 may be a pair of opposing handle connecting rings.

The paint can holder device 10, depicted in FIG. 2, further includes a handle 24 having a handle end 33 and a pair of opposing inwardly bent legs 25, as shown in FIG. 3, which each of the pair of opposing inwardly bent legs 25 extend freely and securely seating through each of the respective pair of opposing handle connecting means 22 to hingedly connect the handle 24 to the can side 11 of the base 18, as shown in FIGS. 1. 2 and 3. In the present invention, the elements which freely connect are defined to be provided with freedom of movement within the connected element.

In other embodiments, the opposing pair of handle connecting means 22 may be other means known in the industry for hingedly connecting the handle 24 to the base 18.

The handle 24 is further provided with a pair of opposing hinge connecting means 26 intermediately disposed, respectively, on the handle 24 between the handle end 33 and the pair of opposing inwardly bent legs 25 which pair of opposing hinge connecting means 26 in this embodiment as shown in FIGS. 2 and 3 are a pair of opposing hinge connecting rings 27, formed on the handle 24.

The paint can holder device 10 further comprises an over center clamping member 28 having a hinge end 23 and an opposing hook end 30, and hingedly, operatively and freely and securely connects the hinge end 23 to the pair of opposing hinge connecting means 26 The pair of opposing hinge connecting means 26 thereby in the embodiment in this manner hingedly and operatively connect the handle 24 to the hook end 30 by the over center clamping member 28, in the same manner as the handle 24 is hingedly connected to pair of opposing handle connecting means 22. In other embodiments, the pair of opposing hinge connecting means 26 may be other means known in the industry for freely and hingedly connecting the handle 24 to the over center clamping member 28.

Figure 6A:
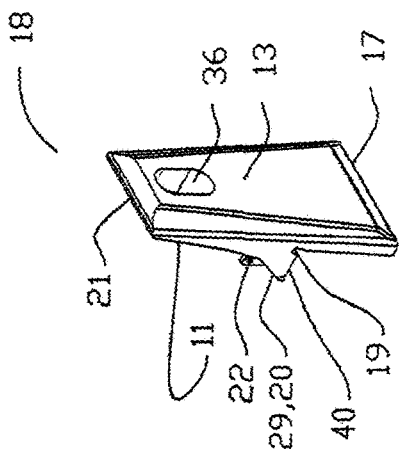
FIGS. 6A-D illustrate various views of the base of the present invention, as follows.
Figure 6B:
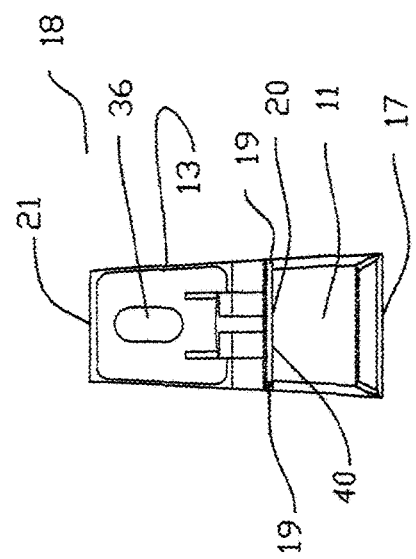

In an alternative embodiment, shown in FIGS. 3 and 6B and C. the ledge 20 comprises a notch 19 located in the ledge 20 between the handle 24 and toward the can end 17 and on the lip side 40 in circumferential conformity with the sealing lip 14, the ledge 20 thereby fitting securely to the sealing lip 14 at the outside 38 of the paint can 12.

Figure 4:
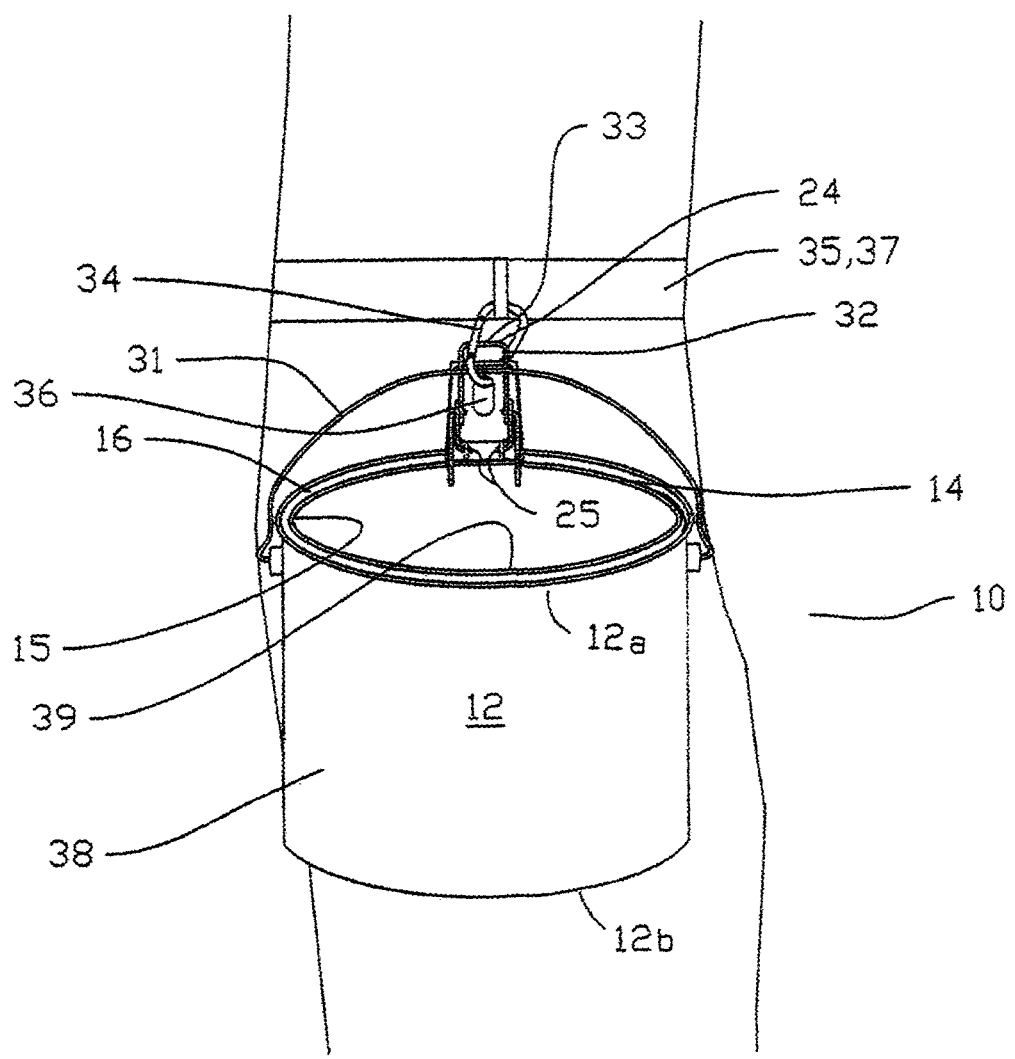
FIG. 4 illustrates a perspective view of the paint can holder device according to the present invention connecting a paint can to a user's garment, a belt of the user, by a connecting means.

As depicted in FIGS. 2 and 4, the sealing lip 14 of the paint can 12 has a topside surface 16 and an opposing underside surface 15. The over center clamping member 28 is provided with a hook end 30 which is shaped to firmly and releasably engage with the opposing underside surface 15 of the sealing lip 14.

The ledge 20, shown in FIG. 1, in one embodiment of the present invention, is shaped to securely conform to the sealing lip 14 of the paint can 12 at the can side 11 of the base 18, the base 18 having an opposing base side 13, and a belt end 19 and an opposing can end 17. The ledge 20 is disposed securely and rests on the topside surface 16 of the sealing lip 14 by use of a notch 21 located in the ledge 20 on the can side 11 of the base 18 between the handle 24 and toward the can end 17. The notch 21 fits securely within the sealing lip 14.

With the ledge 20 resting on the topside surface 16 of the sealing lip 14 and the hook end 30 engaging the underside surface 15 of the sealing lip 14 and the handle 24 manipulated in an anti-clockwise direction ⁻A⁻ as shown in FIG. 2, the over center clamping member 28 clamps the paint can holder device 10 to the paint can 12.

The paint can holder device 10 may be made of plastic or other resilient material. In other embodiments of the present invention, the base 18 is made of plastic and the handle 24 and over center clamping member 28 and connecting component 34 are made of metal. The base 18 in the present invention is of a form that fits onto the sealed lip 14 of the paint can 10 and extends on the outside 38 of the paint can 12, above (to the belt end 21) and below (to the can end 17) at the sealed lip 14 or rim of the paint can 12. The over center clamping member 28 and handle 24 attach to the can side 11 of the base 18. To attach the paint can holder device 10 in the present embodiment to the paint can 12, the user lowers the base 18 onto the paint can 12 sealing lip 14 and then pulls or lowers the handle 24 down, clipping or securing the hook end 30 of the over center clamping member 28 into position at the underside surface 15 of the sealing lip 14 of the paint can 12. The over center clamping member 28 is operatively hinged by the pair of opposing hinge connecting means 26 to the handle 24, and secures the paint can holder device 10 to the paint can 12 in a pressured, clamped, locked or latched manner when the user rotates or pulls up on the handle 24, causing the over center clamping member 28 to pull back onto, or snap onto, the base 18.

The paint can 12, shown in FIG. 4. in an alternate embodiment of the present invention may further be provided with a rotating bale 31, which in the industry is alternatively spelled "bail". The bale 31 can be secured with an offset portion 32 of the handle 24 located proximal of the handle end 33 when the handle 24 is rotated, counter-clockwise, to the clamping position. the action noted as "A" shown in FIGS. 2 and 4.

Figure 5:
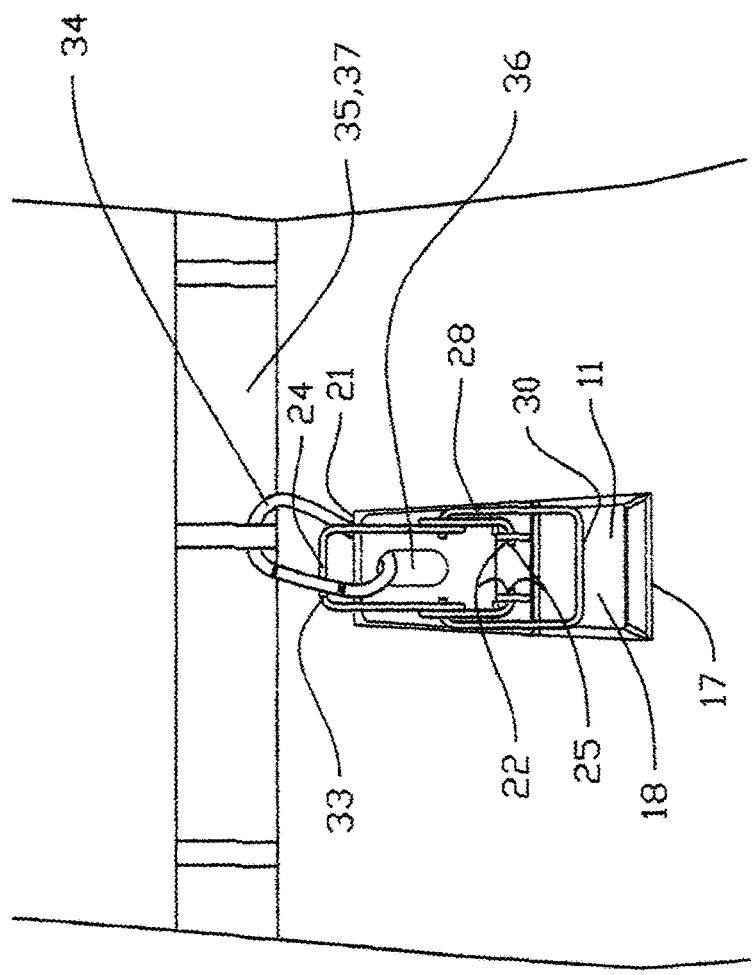
FIG. 5 illustrates a perspective view of the paint can holder device connected by a connecting means to a belt of a user with no paint can attached.

The base 18 in an embodiment of the present invention, shown in FIGS. 2-5, further comprises a clip hole 36 located through the base 18 proximal to the belt end 21 of the base 18, and a connecting component 34 to thread through the clip hole 36 and simultaneously attach to a user's garment 35. A belt clip 34 which in a preferred embodiment is a carabiner may be used for connecting the paint can holder device 10 to a belt 37 or other piece of user's garment 35 as shown in FIGS. 4 and 5. The connecting component 34 is threaded through a clip hole 36 provided in the base 18 toward the belt end 19 in cooperative relation with the handle 24. Once the paint can holder device 10 is latched to the paint can 12, as described above, the paint can 12 by the connecting component 34 is attached to the user, such as a painter. The connecting component 34 may be a spring hook, a loop with a spring loaded gate, pivot clip or carabiner, or other component known in the industry which would thread through the clip hole 36 and attach to a belt 37 in one embodiment of the present invention, as shown in FIG. 4, or other appropriate part of the user's garment 35.

Figure 6C:
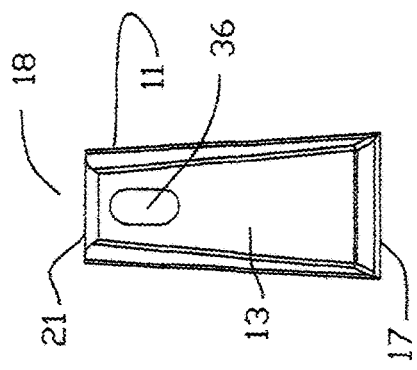
Figure 6D:
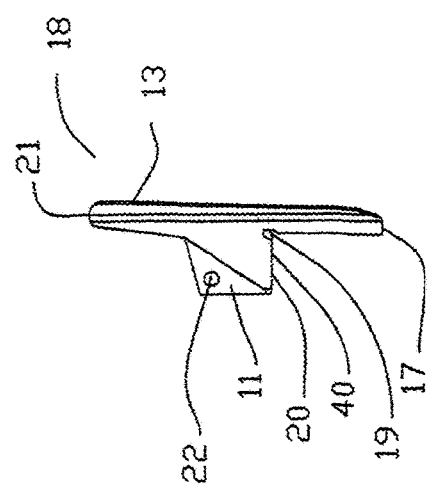

In another embodiment of the present invention, shown in FIG. 6B-C, the ledge 20 is integrally formed to the base 18 and comprises a notch 19 located in the ledge 20 between the handle 25 and toward the can end 17 and in circumferential conformity with the sealing lip 14, the ledge 20 thereby fitting securely to the sealing lip 14 at the outside of the paint can 12.

Attaching the present invention to the side of the paint can 12 instead of attaching to the bale 31 of a paint can 12, a paint bucket, container or other receptacle, the bale 31, being centered on the paint can 12, avoids the tipping and spilling problems and the interference of the bale 31 when the user dips the brush or a roller into the paint can 12.

The present invention allows the user to have free use of his or her hands for painting in a safe manner. After attaching the paint can holder device 10 to the outside 38 of the paint can 12, the paint can holder device 10 can be attached to the user via a carabiner or other connecting component 34. The paint can 12 is clipped or otherwise attached to the connecting component 34, securing the paint can 12 and providing out-of-the-way and efficient use of the paint can 12 and the paint brush or paint roller. As well, the paint can and paint can holder device 10 will not catch on ladders or other protruding matters.

In another embodiment of the present invention, FIGS. 7A-C depict a paint can holder device 10 comprising: a paint can 12 comprising: a cut paint container 42 having an open end 12a and an opposite closed end 12b shown in FIG. 4, an outside 38, an opposing inside 39 and a base 18. The cut paint container 42 comprises: a rotating bale 31 attached to the outside 38 of the cut paint container 42, the base 18 comprising: an elevated bib portion 43 of the cut paint container 42 which elevated bib portion 43 partially defines an open edge 45 of the cut paint container 42, along its circumference of the open end 12a and a clip hole 36 centrally located through the elevated bib portion of the cut paint container 42. The elevated bib portion 43 is centrally located along the open edge 45 and perpendiculary opposed to the bale 31; rotationally, roughly 90 degrees opposite the bale 31 along the open edge 45 of the cut paint container 42. The open edge 45 to the cut paint container 42 would be oriented parallel to the horizontal, except for the elevated bib portion 43 which creates an uneven orientation for the open edge 45. The elevated bib portion 43 therefore defines a cut paint container 42 which is uneven, or not perfectly horizontal along the open edge 45. The bale 31 is freely rotatable over the elevated bib portion 43, so that the bale 31 can rotate from one side of the cut paint container 42 to the other.

The clip hole 36 shown in FIGS. 7A-C is circumscribed through the cut paint container 42 with a clip hole reinforcement 44. The clip hole reinforcement 44 may be a metal or other durable element reinforcing and supporting the integrity of the clip hole 36 during use and may be located on the inside 39 or outside 38 of the cut paint container 42. The paint can holder device 10 has a connecting component 34 to thread through the clip hole 36 and concurrently secure the bale 31 and attach to a user's garment 35, shown in FIG. 7C. The user's garment may be a belt 37 or other compatibly attachable garment worn by the user. The connecting component 34 may be any component known in the industry as set forth above.

The present invention may be used for home improvement or construction painting activities. Another embodiment of the present invention may be used to carry a paint can with the user as described above, to hold and carry other articles in addition to paint. The present invention may be used by painters, handymen, homeowners and other users. One advantage of the paint can or container in the present invention is that the container of paint remains upright, without spilling, when the painter, user bends his or her body. Another advantage of the present invention is that the painter's hands can be completely free to accomplish the painting tasks without holding the paint container.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention device, therefore, should not be restricted, except in the following claims and their equivalents.

I claim:

1. A paint can device comprising:
   (a) a paint can;
   (b) a base, said base comprising: a base end and an opposing can end, a can side having a centrally located ledge integrally formed to said base, the ledge having a lip side shaped to securely conform to a sealing lip of the paint can, a base side opposite to the can side, and a pair of opposing handle connecting means integrally formed in said base on the can side proximal to the can end;
   (c) the paint can comprising: an open end and an opposing closed end, an outside and an opposing inside and the sealing lip;
   (d) a handle comprising: a handle end and a pair of opposing inwardly bent legs, each of the pair of opposing inwardly bent legs extending freely through each of the pair of opposing handle connecting means thereby hingedly connecting the handle to the can side of the base;
   (e) the handle further comprising: a pair of opposing hinge connecting means intermediately disposed, respectively, on the handle between the handle end and the pair of opposing inwardly bent legs;
   (f) an over center clamping member comprising a hinge end and an opposing hook end, and hingedly, operatively and freely connecting to the pair of opposing hinge connecting means at the hinge end;
   (g) the pair of opposing hinge connecting means thereby hingedly and operatively connecting the handle to the hook end by the over center clamping member;
   (h) the sealing lip of the paint can comprising a topside surface and an opposing underside surface;
   (i) the hook end shaped to firmly and releasably engage with the underside surface of the sealing lip;
   (j) the pair of opposing hinge connecting means comprising a pair of opposing hinge connecting rings securely connecting the hinge end, and the pair of opposing handle connecting means comprising a pair of opposing handle connecting holes securely seating the pair of inwardly bent legs;
   (k) the base further comprising a connecting hole located through the base proximal to the base end of the base, and a connecting component threaded through the connecting hole and simultaneously attached to a user's garment;
   (l) the paint can further comprises rotating bale attached to the outside of the paint can and secured within an offset portion of the handle located proximal to the handle end of the handle; and
   (m) whereby the handle operatively causes the over center clamping member at the hook end to clamp the paint can device to the sealing lip of the paint can.

2. A paint can device comprising:
   (a) a paint can;
   (b) a base, said base comprising: a base end and an opposing can end, a can side having a centrally located ledge integrally formed to said base, the ledge having a lip side shaped to securely conform to a sealing lip of the paint can, a base side opposite to the can side, and a pair of opposing handle connecting means integrally formed in said base on the can side proximal to the can end;
   (c) the paint can comprising: an open end and an opposing closed end, an outside and an opposing inside and the sealing lip;
   (d) a handle comprising: a handle end and a pair of opposing inwardly bent legs, each of the pair of opposing inwardly bent legs extending freely through each of the pair of opposing handle connecting means thereby hingedly connecting the handle to the can side of the base;
   (e) the handle further comprising: a pair of opposing hinge connecting means intermediately disposed, respectively, on the handle between the handle end and the pair of opposing inwardly bent legs;
   (f) an over center clamping member comprising a hinge end and an opposing hook end, and hingedly, operatively and freely connecting to the pair of opposing hinge connecting means at the hinge end;
   (g) the pair of opposing binge connecting means thereby hingedly and operatively connecting the handle to the hook end by the over center clamping member;
   (h) the sealing lip of the paint can comprising a topside surface and an opposing underside surface;
   (i) the hook end shaped to firmly and releasably engage with the underside surface of the sealing lip;
   (j) the pair of opposing hinge connecting means comprising a pair of opposing hinge connecting rings securely connecting the hinge end, and the pair of opposing handle connecting means comprise: a pair of opposing handle connecting holes securely seating the pair of inwardly bent legs;

(k) the base further comprising a connecting hole located through the base proximal to the base end of the base, and a connecting component threaded through the connecting hole and simultaneously attached to a user's garment;

(l) the connecting component comprising one of: a spring hook, a loop with a spring loaded gate, a pivot clip or a carabiner, attaching to the user's garment; and (m) whereby the handle operatively causes the over center clamping member at the hook end to clamp the paint can device to the sealing lip of the paint can.

3. The device of claim 2, wherein the user's garment comprises a belt.

4. The device of claim 2, wherein the ledge comprises: a notch located in the ledge between the handle and the can end and on the lip side in circumferential conformity with the sealing lip, the ledge thereby fitting securely to the sealing lip at the outside of the paint can.

5. The device of claim 2, wherein the base is made of resilient plastic.

6. The device of claim 2, wherein the handle and the over center clamping member are made of metal.

7. A paint can device comprising:
(a) a base, said base comprising: a base end and an opposing can end, a base side and an opposing can side, the can side having a centrally located ledge integrally formed to said base and a pair of opposing handle connecting means integrally formed in said base on the can side proximal to the can end;
(b) a paint can having an outside and an opposing inside and a sealing lip;
(c) a handle comprising: a handle end and pair of opposing inwardly bent legs, each of the pair of opposing inwardly bent legs extending freely through each of the pair of opposing handle connecting means thereby hingedly connecting the handle to the can side of the base;
(d) the ledge further comprising: a notch located in the ledge between the handle and the can end and on the lip side in circumferential conformity with the sealing lip, the ledge thereby fitting securely to the sealing lip at the outside of the paint can;
(e) the handle further comprising: a pair of opposing hinge connecting means intermediately disposed, respectively, on the handle between the handle end and the pair of opposing inwardly bent legs;
(f) an over center clamping member comprising a hinge end and an opposing hook end, and hingedly, operatively and freely connecting to the pair of opposing hinge connecting means at the hinge end;
(g) the pair of opposing hinge connecting means thereby hingedly and operatively connecting the handle to the hook end by the over center clamping member;
(h) the sealing lip of the paint can comprising a topside surface and an opposing underside surface;
(i) the hook end shaped to firmly and releasably engage with the underside surface of the sealing lip;
(j) the pair of opposing hinge connecting means comprising a pair of opposing hinge connecting rings securely connecting the hinge end, and the pair of opposing handle connecting means comprise: pair of opposing handle connecting holes securely seating the pair of inwardly bent legs;
(k) the base further comprising a connecting hole located through the base proximal to the base end of the base, and a connecting component threaded through the dip connecting hole and attached to a user's garment,
(l) the paint can further comprises a rotating bale attached to the outside of the paint can and secured within an offset portion of the handle located proximal to the handle end of the handle; and
(l) whereby the handle operatively causes the over center clamping member at the hook end to clamp the paint can device to the sealing lip of the paint can.

8. A paint can device comprising:
(a) a base, said base comprising: a base end and an opposing can end, a base side and an opposing can side, the can side having a centrally located ledge integrally formed to said base and a pair of opposing handle connecting means integrally formed in said base on the can side proximal to the can end;
(b) a paint can having an outside and an opposing inside and a sealing lip;
(c) a handle comprising: a handle end and pair of opposing inwardly bent legs, each of the pair of opposing inwardly bent legs extending freely through each of the pair of opposing handle connecting means thereby hingedly connecting the handle to the can side of the base;
(d) the ledge further comprising: a notch located in the ledge between the handle and the can end and on the lip side in circumferential conformity with the sealing lip, the ledge thereby fitting securely to the sealing lip at the outside of the paint can;
(e) the handle further comprising: a pair of opposing hinge connecting means intermediately disposed, respectively, on the handle between the handle end and the pair of opposing inwardly bent legs;
(f) an over center clamping member comprising a hinge end and an opposing hook end, and hingedly, operatively and freely connecting to the pair of opposing hinge connecting means at the hinge end;
(g) the pair of opposing hinge connecting means thereby hingedly and operatively connecting the handle to the hook end by the over center clamping member;
(h) the sealing lip of the paint can comprising a topside surface and an opposing underside surface;
(i) the hook end shaped to firmly and releasably engage with the underside surface of the sealing lip;
(j) the pair of opposing hinge connecting means comprising a pair of opposing hinge connecting rings securely connecting the hinge end, and the pair of opposing handle connecting means comprise: pair of opposing handle connecting holes securely seating the pair of inwardly bent legs;
(k) the base further comprises: a connecting hole located through the base proximal to the base end of the base, and a connecting component threaded through the connecting hole and attached to a user's garment;
(l) the connecting component comprising one of: a spring hook, a loop with a spring loaded gate, a pivot clip or a carabiner, attaching to the user's garment; and
(m) whereby the handle operatively causes the over center clamping member at the hook end to clamp the paint can device to the sealing lip of the paint can.

9. The device of claim 8, wherein the user's garment comprises a belt.

10. The device of claim 8, wherein the base is made of resilient plastic.

11. The device of claim 8, wherein the handle and the over center clamping member are made of metal.

* * * * *